US007954505B2

(12) United States Patent
Odachowski

(10) Patent No.: US 7,954,505 B2
(45) Date of Patent: Jun. 7, 2011

(54) MOBILE LEAKAGE CONTAINMENT BOX INCLUDING A LIQUID IMPERMEABLE MEMBRANE

(76) Inventor: Matthew Odachowski, Ocean City, MD (US)

( * ) Notice: Subject to any disclaimer, the term of this patent is extended or adjusted under 35 U.S.C. 154(b) by 228 days.

(21) Appl. No.: 12/315,570

(22) Filed: Dec. 3, 2008

(65) Prior Publication Data

US 2009/0159137 A1    Jun. 25, 2009

Related U.S. Application Data

(60) Provisional application No. 61/115,198, filed on Nov. 17, 2008.

(51) Int. Cl.
*B65D 25/00* (2006.01)
(52) U.S. Cl. .................. 137/15.11; 137/312; 137/357
(58) Field of Classification Search .............. 137/312, 137/357, 15.11; 220/571; 222/108; 141/86
See application file for complete search history.

(56) References Cited

U.S. PATENT DOCUMENTS

| | | | | |
|---|---|---|---|---|
| 4,245,666 A | * | 1/1981 | Norris | 137/357 |
| 4,633,899 A | * | 1/1987 | Lord | 137/357 |
| 5,101,868 A | | 4/1992 | Balch | 141/86 |
| 5,133,167 A | * | 7/1992 | Drew et al. | 52/506.08 |
| 5,172,718 A | | 12/1992 | Thornburgh | 137/312 |
| 5,299,591 A | * | 4/1994 | Duncan | 137/15.11 |
| 5,365,968 A | * | 11/1994 | Mills | 137/312 |
| 6,238,137 B1 | | 5/2001 | Whitworth et al. | 405/38 |
| 6,283,144 B1 | | 9/2001 | Kahn | 137/357 |
| 6,622,750 B1 | | 9/2003 | Bergeron | 137/312 |
| 6,845,784 B2 | | 1/2005 | Pascznk | 137/312 |
| 7,017,313 B1 | | 3/2006 | Mueller | 52/302.1 |
| 7,331,357 B2 | | 2/2008 | Huff | 137/312 |

* cited by examiner

*Primary Examiner* — Kevin L Lee
(74) *Attorney, Agent, or Firm* — Larry J. Guffey

(57) ABSTRACT

A mobile, emergency apparatus that can be used to minimize the flood damage to the property in rooms that experience ceiling or roof water leaks includes: (a) a container that has exterior and interior surfaces that include a bottom and sidewalls with free edges that form the rim of an opening to the container's interior surface which also includes an aperture, (b) a plurality of hinges that are attached proximate the container's rim, (c) a plurality of extendible leashes that are attached to the hinges and with each of these leashes having a free end to which is attached an anchor, and (d) a liquid impermeable membrane that has an outer edge and an opening, with this opening having an edge that is attached around the perimeter of the container's aperture, and wherein the container, membrane and hose are sized so that the membrane and hose are storable in the container when the apparatus is not in use.

14 Claims, 1 Drawing Sheet

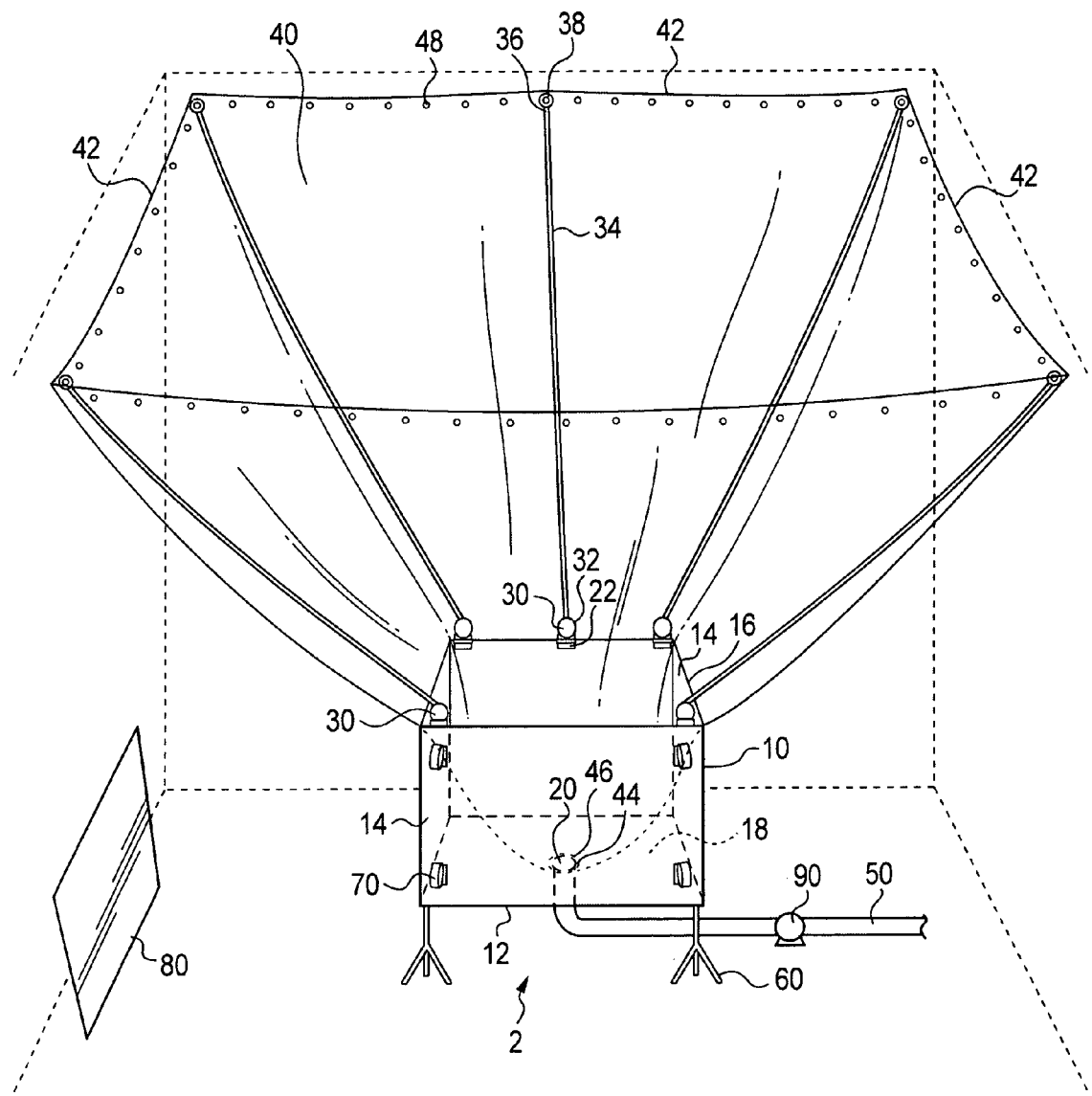

US 7,954,505 B2

MOBILE LEAKAGE CONTAINMENT BOX INCLUDING A LIQUID IMPERMEABLE MEMBRANE

CROSS-REFERENCE TO RELATED APPLICATION

This application claims the benefit of Provisional Patent Application No. 61/115,198, filed Nov. 17, 2008 by Matthew Odachowski. The teachings of this application are incorporated herein by reference to the extent that they do not conflict with the teaching herein.

BACKGROUND OF THE INVENTION

1. Field of the Invention

This invention relates to building structures and the means for controlling flooding and minimizing water damage therein. More particularly, this invention relates to an apparatus or method for protecting the furnishings and materials within a room from damage by water coming from the ceiling above.

2. Description of the Related Art

Broken pipes in ceilings and roof leaks, especially catastrophic breaks or leaks, cause hundreds of millions of dollars of damage each year. It is often the case that a large percentage of this damage is sustained by the materials and furnishings situated in the rooms below these leaks.

Even after emergency personnel arrive to respond to these situations, the damage to the property below these leaks continues to accumulate as there is usually no easy and effective away to divert the incoming water away from spilling onto the property below until the source of the water can be turned off or runs dry.

To minimize the flood damage to the property in rooms that experience ceiling or roof water leaks, there is needed a mobile, emergency apparatus that first responders can use to quickly shield and protect such property while controlling or diverting the incoming flood water so that it can be directly to an appropriate drainage area.

SUMMARY OF THE INVENTION

Recognizing the need for the development of improved apparatus and methods for minimizing the flood damage to the property in rooms that experience ceiling or roof water leaks, the present invention is generally directed to satisfying the needs set forth above and overcoming the disadvantages identified with prior art devices and methods.

In accordance with the present invention, a mobile, emergency apparatus that can be used to minimize the flood damage to the property in rooms that experience ceiling or roof water leaks includes: (a) a container that has exterior and interior surfaces that include a bottom and sidewalls with free edges that form the rim of an opening to the container's interior surface which also includes an aperture, (b) a plurality of hinges that are attached proximate the container's rim, (c) a plurality of extendible leashes that are attached to the hinges and with each of these leashes having a free end to which is attached an anchor, and (d) a liquid impermeable membrane that has an outer edge and an opening, with this opening having an edge that is attached around the perimeter of the container's aperture, and wherein the container, membrane and hose are sized so that the membrane and hose are storable in the container when the apparatus is not in use.

In accordance with the present invention, a method for providing a mobile, emergency apparatus that can be used to minimize the flood damage to the property in rooms that experience ceiling or roof water leaks includes the steps of providing: (a) a container that has exterior and interior surfaces that include a bottom and sidewalls with free edges that form the rim of an opening to the container's interior surface which also includes an aperture, (b) a plurality of hinges that are attached proximate the container's rim, (c) a plurality of extendible leashes that are attached to the hinges and with each of these leashes having a free end to which is attached an anchor, and (d) a liquid impermeable membrane that has an outer edge and an opening, with this opening having an edge that is attached around the perimeter of the container's aperture.

BRIEF DESCRIPTION OF THE DRAWINGS

The accompanying FIGURE shows a perspective view of a preferred embodiment of the present invention.

DESCRIPTION OF THE PREFERRED EMBODIMENT

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

In a preferred embodiment, the present invention (denoted herein as a "flood box") takes the form of a mobile, emergency apparatus that can be used to minimize the flood damage to the property in rooms that experience ceiling or roof, water leaks. It includes a mobile container that, when needed, can be situated or located under and near the middle of a leaking ceiling area.

To utilize the apparatus, one removes its lid and finds that there are stored within the container, when it's not in use, the various elements that one can use to rig various lines and a water impermeable sheet that serve to funnel the incoming water into the container which then serves as a reservoir from which the water can be pumped or drained under gravity to a suitable dumping area or sewer.

The accompanying FIGURE shows shows a preferred embodiment of the present invention, it is an apparatus 2 that includes: a reservoir, trunk or container 10 that has a bottom 12, and four sidewalls 14 whose free edges come together to form a rim 16 that defines an opening into the container's interior 18. In the bottom of the container there is an aperture 20 through which the water that collects in the container can be drained from it.

A plurality of hinges 22 are situated on or proximate the container's rim 16. To each of these hinges is attached one of a plurality of extendible leashes 30. When not in use, these hinges are pivoted forward so that they allow the leashes which they hold to be stored within the container.

Each of these leashes has a case 32 and a line 34 that, in a stored situation, is wrapped around a spool within the case. The line has a free end 36 that can be extended so that it is near the perimeter of the ceiling area from which the water is coming. An anchor 38 is attached to these free ends to provide a means for attaching the line's free end to the ceiling or roof. When these lines 34 are attached in this manner, they effectively form a temporary support or rafter structure that can be used to hold in place a tarp that is used to funnel the water coming from the ceiling into the container 10.

Once each (or as many as are needed) of these leash lines is attached at various points on the perimeter of the ceiling region from which water is coming, the outer edge 42 of a plastic or water or liquid impermeable membrane, tarp or sheet 40 that is stored in the container is extended to the ceiling and affixed to the lines' anchors 38. A plurality of grommets 48 are affixed proximate the sheet's outer edge and are used, along with some tie ropes, to hold the outer edges of this sheet close to the anchors and therefore close to the ceiling.

This sheet 40 also has an opening 44 that is proximate its center. The edge 46 of this opening is affixed to the container's interior 18 so that it in some way surrounds the perimeter of the container's aperture. Thus, when the sheet's outer edge is affixed to the ceiling at points beyond the perimeter of the incoming water, the sheet can then serve as a funnel to direct the water into the container and towards its aperture.

One end of a hose 50 is connected to the container's aperture 20 and the hose is used to drain the water that collects in the container to a nearby sewer or drainage area.

To promote water drainage under gravity and to allow access to the bottom of the container where the aperture is located, there are also stored in the container a plurality of variable-height stands 60 that are placed such that the bottom corners of the container can be placed on them, thereby elevating the container when the apparatus 2 is in use. Alternatively, such stands can be fabricated so that they have variable lengths and can be affixed directly to or proximate the outside of the container's bottom surface so that they can be retracted when the apparatus is not in use.

When the apparatus is not in use, and its container has stored within it the apparatus' hose, pump, plastic sheet and possibly it stands. So as to make the apparatus more portable, its container has attached to the corners of one or its sides or bottom one of each of four wheels 70 or other means for making it easier to move said apparatus over any terrain that it might encounter when being transported. A lid 80 that fits on the container's rim and is used to close the container's opening when the apparatus is not in use and it is being transported from one job site to another. The lid can be either fully removable from the container or it can be attached on an edge to the container and hinged so that it flips over to close the container's opening.

If gravity drainage is insufficient to empty water from the container, a pump 90 can be used by appropriate connecting it somewhere along the hose that is being used to drain the container.

Those knowledgeable with the various elements of the apparatus described above will recognize that a variety of materials can be used to fabricate them (e.g., the container can be made of plastic so as to make it both lightweight and water-tight); all of these possible embodiments are considered to be within the scope of the present invention.

The nature of the present invention and its method of use are such that it has been found possible for one person to situate the apparatus and get it operational (i.e., unload and connect, assuming the availability of a ladder and the appropriate tools for inserting the anchors and connecting the hose), including attaching its leash lines and impermeable sheet to the ceiling, in just a few minutes.

The foregoing is considered as illustrative only of the principles of the present invention. Further, since numerous modifications and changes will readily occur to those skilled in the art, and because of the wide extent of the teachings disclosed herein, the foregoing disclosure should not be considered to limit the invention to the exact construction and operation shown and described herein. Accordingly, all suitable modifications and equivalents of the present disclosure may be resorted to and still considered to fall within the scope of the invention as will be later set forth in claims to the present invention.

I claim:

1. A mobile, emergency apparatus that can be used to minimize the flood damage to the property in rooms that experience ceiling or roof water leaks, said apparatus comprising:
    a container having an exterior and an interior surface that includes a bottom and sidewalls with free edges that form the rim of an opening to said container interior surface, said container bottom having an aperture,
    a plurality of hinges attached proximate said container rim,
    a plurality of extendible leashes that are attached to said hinges, each of said leashes having a free end and an anchor attached to said free ends, and
    a liquid impermeable membrane having an outer edge and an opening, said membrane opening having an edge that is attached around the perimeter of said container bottom aperture.

2. The apparatus as recited in claim 1, further comprising a hose having ends, one of which is connectable to said container bottom aperture.

3. The apparatus as recited in claim 2, wherein said container, membrane and hose are sized so that said membrane and hose are storable in said container when said apparatus is not in use.

4. The apparatus as recited in claim 3, further comprising a plurality of stands for elevating said container bottom when said apparatus is in use, said stands when not in use situated at a location chosen from stored within said container or affixed in a retracted position proximate said container bottom.

5. The apparatus as recited in claim 4, further comprising a lid that fits on said container rim and is used to close said container opening when said apparatus is not in use.

6. The apparatus as recited in claim 5, further comprising a means attached to said container for making it easier to move said apparatus over any terrain that said container encounters when being transported.

7. The apparatus as recited in claim 5, further comprising a pump having an inlet that is connectable to said apparatus at a location chosen from the group consisting of said container aperture or one of said hose ends, and wherein said container is further sized so that said pump is storable in said container when said apparatus is not in use.

8. A method for providing a mobile, emergency apparatus that can be used to minimize the flood damage to the property in rooms that experience ceiling or roof water leaks, said method comprising the steps of:
    providing a container having an exterior and an interior surface that includes a bottom and sidewalls with free edges that form the rim of an opening to said container interior surface, said container bottom having an aperture,
    providing a plurality of hinges attached proximate said container rim,
    providing a plurality of extendible leashes that are attached to said hinges, each of said leashes having a free end and an anchor attached to said free ends, and
    providing a liquid impermeable membrane having an outer edge and an opening, said membrane opening having an edge that is attached around the perimeter of said container bottom aperture.

9. The method as recited in claim 8, further comprising the step of providing a hose having ends, one of which is connectable to said container bottom aperture.

10. The method as recited in claim 9, wherein said container, membrane and hose are sized so that said membrane and hose are storable in said container when said apparatus is not in use.

11. The method as recited in claim 10, further comprising the step of providing a plurality of stands for elevating said container bottom when said apparatus is in use, said stands when not in use situated at a location chosen from stored within said container or affixed in a retracted position proximate said container bottom.

12. The method as recited in claim 11, further comprising the step of providing a lid that fits on said container rim and is used to close said container opening when said apparatus is not in use.

13. The method as recited in claim 12, further comprising the step of providing a means attached to said container for making it easier to move said apparatus over any terrain that said container encounters when being transported.

14. The method as recited in claim 12, further comprising the step of providing a pump having an inlet that is connectable to said apparatus at a location chosen from the group consisting of said container aperture or one of said hose ends, and wherein said container is further sized so that said pump is storable in said container when said apparatus is not in use.

* * * * *